United States Patent [19]

Gerstenmaier et al.

[11] Patent Number: 5,372,411
[45] Date of Patent: Dec. 13, 1994

[54] SAFETY EQUIPMENT FOR A MOTOR VEHICLE

[75] Inventors: Juergen Gerstenmaier, Beilstein; Heinz Leiber, Oberriexingen, both of Germany

[73] Assignees: Robert Bosch GmbH; Mercedes-Benz AG, both of Stuttgart, Germany

[21] Appl. No.: 46,552

[22] Filed: Apr. 12, 1993

[30] Foreign Application Priority Data

Apr. 13, 1992 [DE] Germany .............................. 4212337

[51] Int. Cl.5 .................... B60T 8/32; B60K 28/16; B60R 21/32; B60R 22/46
[52] U.S. Cl. ..................... 303/100; 180/282; 303/92
[58] Field of Search ............. 303/100, 92, 106; 180/282, 274; 364/424.05, 424.01, 426.01, 426.02, 426.03; 188/181 A, 181 R; 340/436; 280/735, 734, 806, 733

[56] References Cited

U.S. PATENT DOCUMENTS

| | | | |
|---|---|---|---|
| 4,381,829 | 5/1983 | Montaron | 180/274 |
| 4,773,072 | 9/1988 | Fennel | 371/68 |
| 4,917,443 | 4/1990 | Kramer et al. | 303/92 |
| 5,176,429 | 1/1993 | Junichi | 303/92 |
| 5,193,887 | 3/1993 | Bleckmann et al. | 303/92 |
| 5,229,943 | 7/1993 | Eigler et al. | 180/282 |
| 5,261,506 | 11/1993 | Jost | 180/282 |

FOREIGN PATENT DOCUMENTS

| | | |
|---|---|---|
| 3737554 | 5/1989 | Germany . |
| 3802015 | 7/1989 | Germany . |
| 3811217 | 10/1989 | Germany . |
| 4107330 | 9/1991 | Germany . |
| 2127507 | 4/1984 | United Kingdom . |
| 2202016 | 9/1988 | United Kingdom . |
| 9100200 | 1/1991 | WIPO . |

Primary Examiner—Douglas C. Butler
Attorney, Agent, or Firm—Felfe & Lynch

[57] ABSTRACT

Common control apparatus provided for ABS/ABSR and an occupant restraint system processes the sensor signals redundantly in two parallel channels, the system-specific user programs being worked in multiplex.

9 Claims, 5 Drawing Sheets

SAFETY EQUIPMENT FOR A MOTOR VEHICLE

BACKGROUND OF THE INVENTION

Antilock brake system and antilock skid control systems (ABS/ABSR) and restraint systems (RHS) are state of the art as independent systems. ABS and ASR are often combined into a single system, referred to herein as ABSR. RHS refers to systems including, e.g. air bags and belt tighteners.

They make use of electronic control apparatus on the basis of microcontrollers for processing the controls and steering algorithms. The circuitry of these apparatus is similar: on the one hand due to processing of the sensor signals through the signal chain, digital signal processing, and power output to operate actuators, and on the other hand due to the need for error-proof protective structures, condition for systems with responsibility for safety (redundancy, test cycles etc.). The typical structure of electronic controls responsible for safety is represented in FIG. 1.

Therein, 1 is an input circuit for the sensor signals, 2a and 2b are two microprocessors for the redundant processing of the sensor signals, 3 a power output block for the operation of actuators, 4 a so-called surveillance and safety circuit, and 5 a relay with a switch with which a shut-down of the system is effected if an error is detected.

As regards the sensing system there is another thing common to both. Both systems make use of sensors which on the one hand, by measuring the wheel speed, and on the other hand by measuring the vehicle acceleration or deceleration, give indications of the dynamic behavior of the vehicle.

SUMMARY OF THE INVENTION

The concept of the invention covers both systems by the common use of comparable function blocks in a single apparatus, and thus results in a substantial reduction of the hardware cost.

Also, by the additional processing of the signals from the RHS acceleration sensor in the ABS/ABSR or of the signals of the ABS/ABSR wheel speed sensors in the RHS, improvements in operation and a gain in safety by the construction of plausibilities between the sensors.

The concept provides for the preparation and processing of the sensor signals, the operation of the actuators and the use and preparation of auxiliary functions in a single apparatus. The sensors for detecting the physical factors of wheel speed and vehicle acceleration are provided on the spot.

This is shown in FIG. 2. In a common control apparatus 6 are the sensors 7 of the ABSR (wheel speed sensors) on the one hand, and on the other hand the sensor 8 (vehicle deceleration sensor) of the RHS. The actuators of the two systems are indicated at 9 (magnetic valves) and 10 (primer pellets) of the RHS.

DETAILED DESCRIPTION OF THE PREFERRED EMBODIMENT

Figure 1:
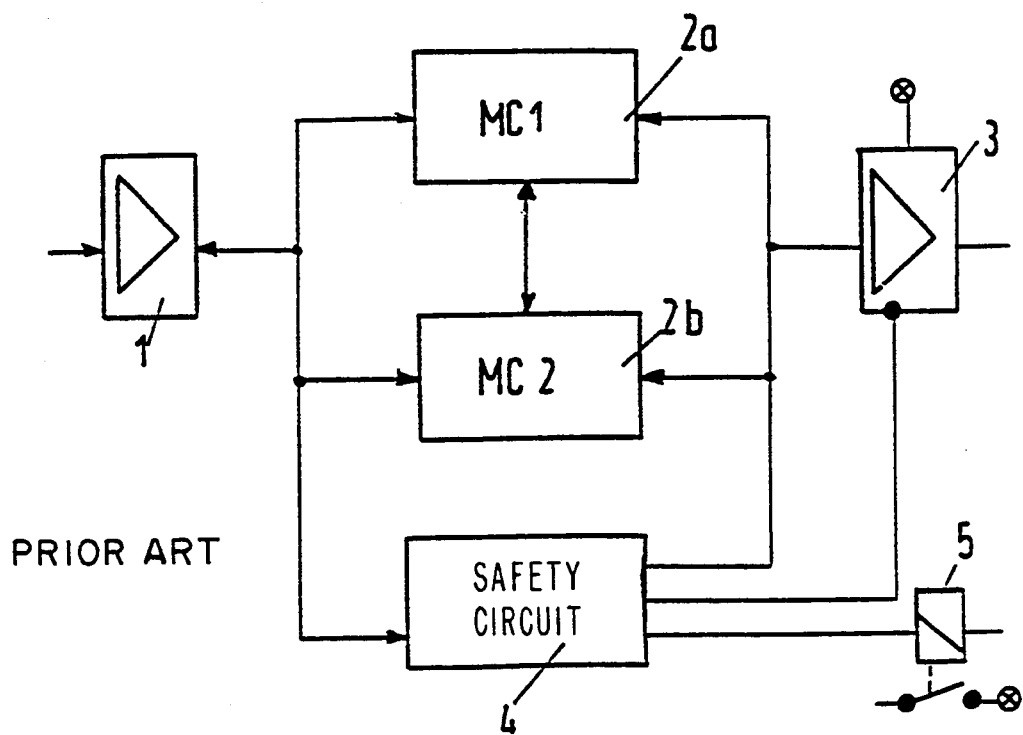
FIG. 1 is a diagram of typical prior circuitry for either ABSR or RHS.
Figure 2:
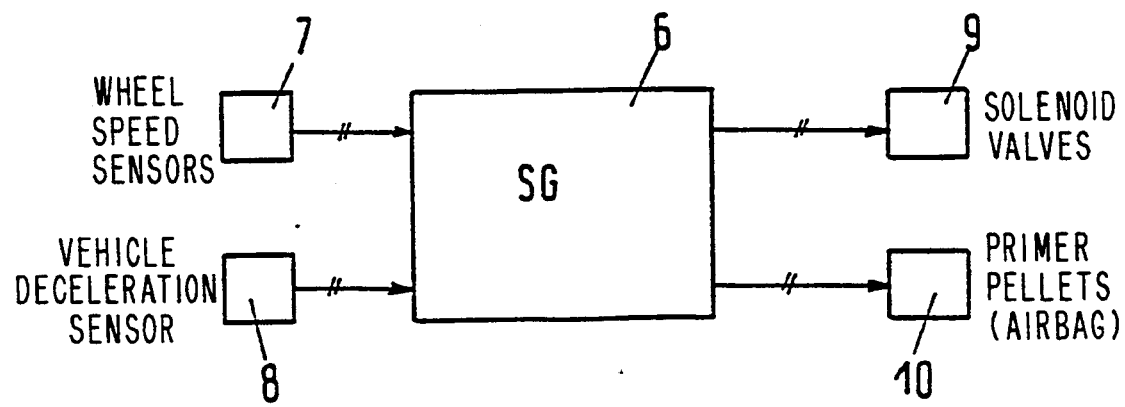
FIG. 2 is a diagram illustrating the broad concept of the present invention.
Figure 3:
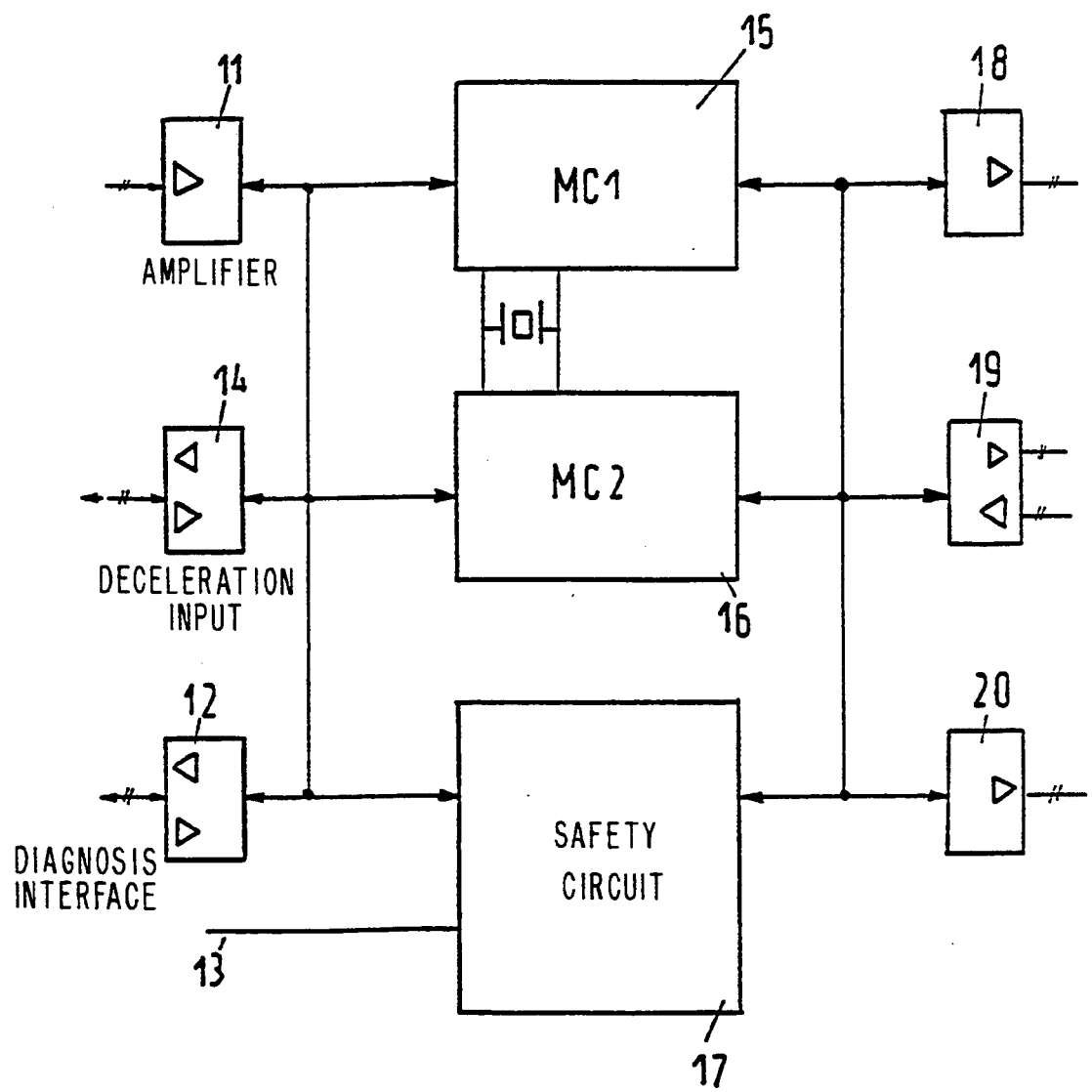
FIG. 3 is a diagram of the control apparatus illustrating the redundant processing.

FIG. 3 shows the typical structure of the control apparatus with the important function blocks. 11 is an input amplifier for the wheel speed signals, 12 a block for the diagnosis interface, 13 the battery voltage input, and 14 the input switch for the deceleration. Two microprocessors 15 and 16 redundantly process the signals in time multiplex and operate the connected actuators via the output amplifier 18 (ABSR) and 19 (RHS); 17 is a block that serves mainly for safety, e.g., stabilizes the supply voltage and watches for undervoltage and overvoltage, checks for the correct operation of the microprocessors and contains an error memory so as to record where an error occurred. In case of an error it operates the safety relay and/or warning lights through an amplifier 20.

An automatic call for help could also be included, which for example learns the location of the car involved in the accident by means of a GPS receiver and calls for help by radio or telephone.

Figure 4:
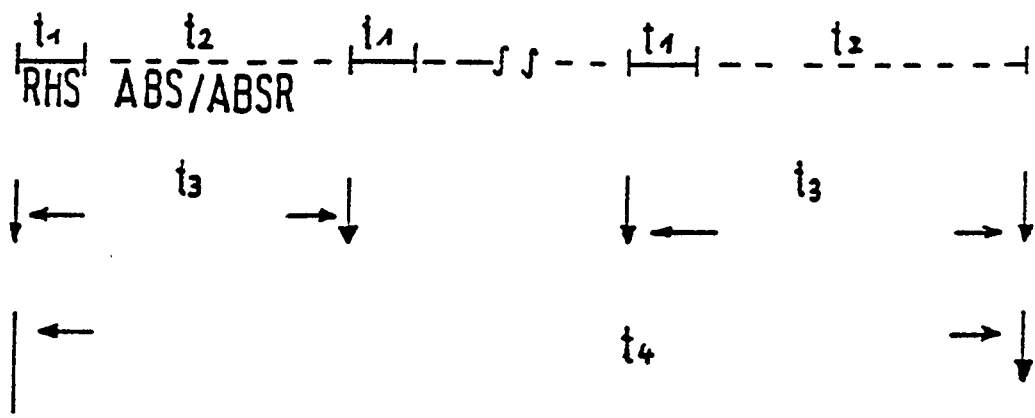
FIG. 4 is a timing diagram illustrating the multiplexed signal processing for the two systems.

The microprocessors 15 and 16 operate redundantly both of the system-specific user programs. The operating software and basic safety software (redundancy comparison, internal computer tests, test cycles etc.) are identical for both systems. Since different real time requirements must be satisfied by the systems (scanning rates and processing in the case of RHS are considerably more time-critical), a nested running of the user programs must be provided, as indicated in FIG. 4. In the time periods $t_1$ (e.g., 200–300 microseconds), the vehicle deceleration is determined and processed. In several computation periods $t_2$ (e.g., 500–600 microseconds) the wheel speeds are determined and converted to brake pressure control signals. $t_4$ is the cycle time period after which the ABS/ABSR algorithm is completed.

$t_1$ is the cycle time of the RHS; in the period $t_1$ the RHS algorithm is entirely completed. In the respective time $t_2$ only a part (1/n) of the ABS/ABSR algorithm is completed if n is the number of necessary computing periods $t_2$ needed to complete the ABS algorithm. Between times $t_2$ a time $t_1$ is always present; $t_3$ is the sum of $t_1$ plus $t_2$. In the time $t_4$ ($=nt_3$), the ABS algorithm is completed one time, while the RHS algorithm is completed n times.

In block 17 of FIG. 3 the function blocks are usable in common with the following features:

The diagnosis interface

A common stimulation and data output is possible via an interface, and an individual stimulation (ABS/ABSR or RHS) via appropriate addresses.

The detection of the battery voltage (filtering and wrong polarity/overvoltage protection) and the production of a stabilized supply voltage.

Checking the battery and the stabilized power supply for overvoltage and undervoltage.

The undervoltage and overvoltage check consists of a software controlled part and a hardware part. Thus different thresholds and cutoffs are obtained (adaptation to various system requirements).

Programming of control apparatus, possibly with parameters specific for the vehicle type.

The following cutoff criteria, for example, can be defined, using the following abbreviations:

| | |
|---|---|
| UB | = Battery voltage |
| UST | = stabilized power supply voltage |
| $S_1 > S_2 > S_3 > S_4$ | = undervoltage thresholds |
| $S_5, S_6$ | = overvoltage thresholds |
| SW | = software |
| HW | = hardware |

| Threshold | SW/HW | Reaction | Cutout path |
|---|---|---|---|
| $UB < S_1$ | SW | ABS "OFF" | ABS output stage is blocked |
| $UB < S_2$ | SW | ABS/RHS "OFF" | ABS/RHS output stage is blocked |
| $UB < S_3$ | HW | ABS/RHS "OFF" | ABS/RHS output stage is blocked<br>Drop-out safety relay<br>System reset |
| $UB < S_4$ | HW | " | ABS/RHS output stage is blocked<br>Drop-out safety relay<br>System reset |
| $UB > S_5$ | HW | | ABS/RHS output stage is blocked<br>Drop-out safety relay<br>System reset |
| $UST > S_6$ | HW | " | ABS/RHS output stage is blocked<br>Drop-out safety relay<br>System reset |

A Power-On-Reset
Initialization entire system
A "Watch Dog" and the use of error memories The watch-dog program when addressed sets an HW error memory and shuts down the entire system by blocking the output stages and dropping out the safety relay. The entire error memory consists of two parts in order to shut off the ABS/ABSR or RHS selectively if necessary for reasons of system availability. The initiation runs a safety software in the microprocessor. The error signals are put out jointly by an OR-gate. If the redundancy check responds (processor error), both error signals become active.

Figure 5:
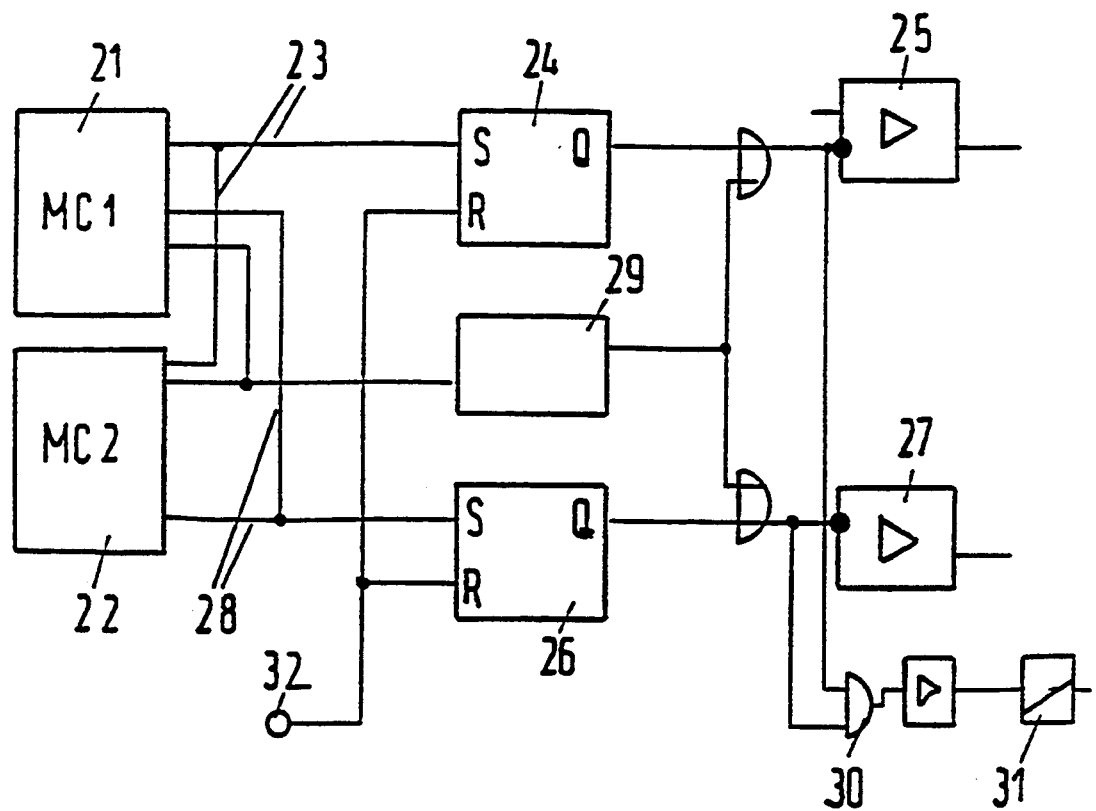
FIG. 5 is a diagram of the cut-off circuitry.

FIG. 5 shows an embodiment of the cutoff. The uppermost output lines 23 of the microprocessors 21 and 22 lead to a bistable circuit 24, which in case of an error in the ABSR-specific part of the microprocessors becomes set, and then blocks the ABS output amplifier 25. Accordingly, a bistable circuit 26 is set and thus the RHS output amplifier 27 is blocked if an RHS-specific error is signaled over lines 28. A watch-dog block 29 produces an output signal when at least one microprocessor signals an error. If both system-specific parts of the two microprocessors signal an error and thus both bistable stages 24 and 25 have responded, the safety relay 31 is additionally activated through an AND gate 30 and shuts off the power supply. A watch-dog signal from block 29 indicating that at least one microprocessor is working incorrectly has also the additional effect that the safety relay shuts off the power supply.

The bistable circuits 24 and 26 can be reset during service by a signal to terminal 32, thereby restarting the system that was shut off.

Figure 6:
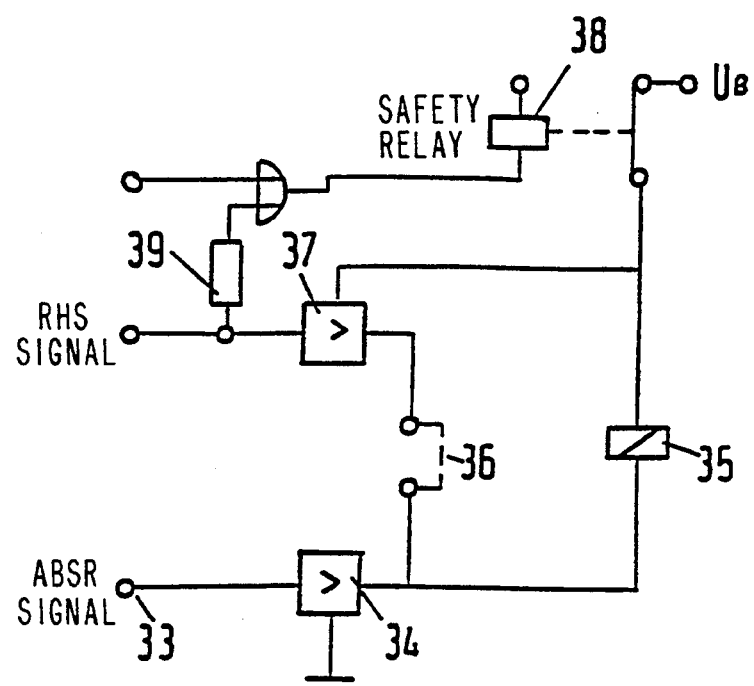
FIG. 6 is a diagram of a common power output stage for the two systems.

The power output stages can, as shown in the block circuit diagram of FIG. 3, be made independent of one another, although it is also possible to use parts of the circuits in common (FIG. 6). In the case of ABS/ABSR control operation, an N switch 34 is activated through a terminal 33. This closes the circuit between $U_\beta$ and ground, and activates valve 35. In the case of RHS crash, a P switch (37) and the N switch 34 are activated. The parallel activation of the ABSR valve 35 is uncritical, since the time necessary for the ignition of the primer pellet 36 for the air bag ranges from 1 to 2 milliseconds. If desired, the safety relay 38 can open the switch from $U_\beta$ after the time t (time for the definite firing of the pellet) of the timing circuit 39. This cancels operation of the ABSR valve 35. Alternatively, the valves or the primer pellet could be operated through a relay contact.

Figure 7:
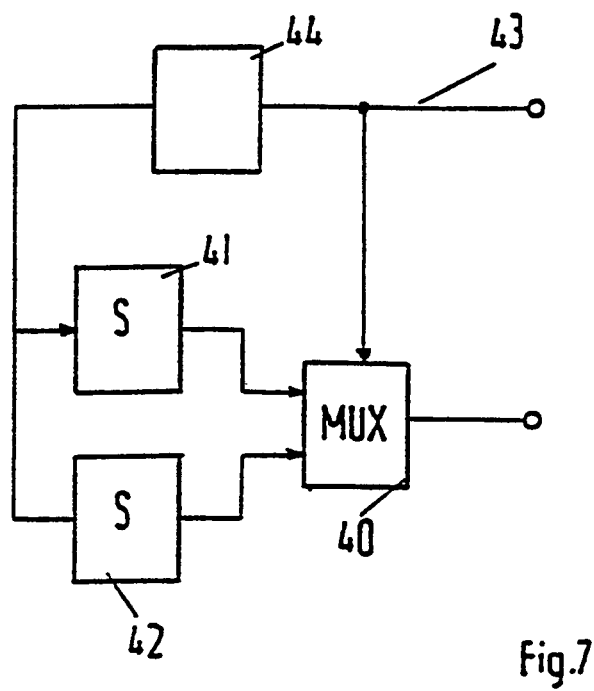
FIG. 7 is a diagram showing a redundant acceleration sensor for the RHS.

The acceleration signal is highly relevant to safety and must be produced and transmitted flawlessly. A redundant sensor application, known in principle, serves for this purpose with an out-of-phase output signal and a sensor test. This is shown in FIG. 7.

To minimize the interface the signals of sensors 41 and 42 are multiplexed (block 40). The multiplex signal and test signal are transferred on a line 43. The transfer can thus be permanently monitored by evaluating the timing of the sensor signal.

Being out of phase protects against rectified interference (capacitive coupling on the line).

Figure 8A:
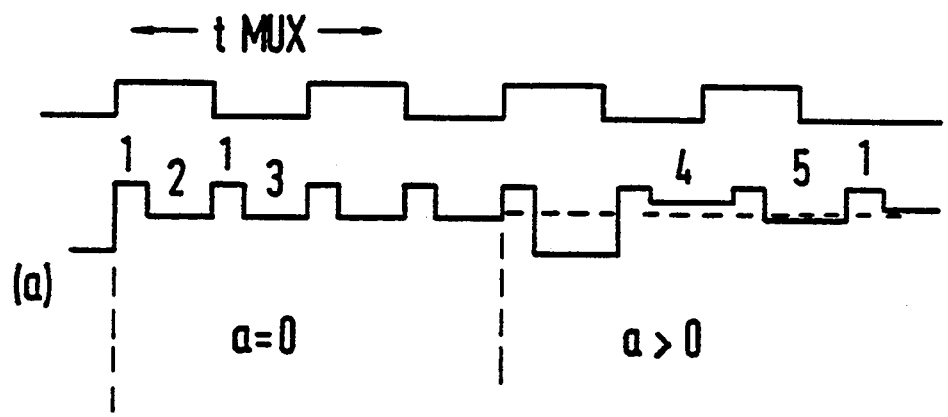
FIG. 8a is a timing diagram illustrating the action of the circuit of FIG. 7.
Figure 8B:
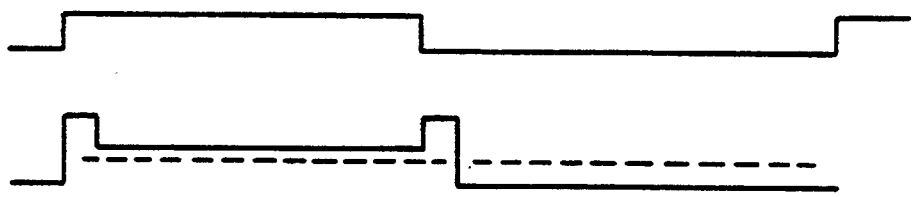
FIG. 8b is a timing diagram illustrating the testing of the circuit on FIG. 7.

The action of the circuit is explained with the aid of FIG. 8a. If the delay a=0, the output signal from block 40 in FIG. 7 is represented as shown in the bottom line of FIG. 8, on the left. The upper line shows the multiplex switching signal. 1 identifies time marks at the beginning of the signal after a switching. Since a=0 the sensor signal is at the center voltage in the phases 2 and 3, in which different sensors are turned on. In phases 4 and 5, which show the sensor signals at $|a|<0$, the signal values are shifted by $+U_s$ and $-U_s$ with respect to the center voltage.

In the test operation (FIG. 8b), which is distinguished from multiplex operation by a very much longer starting signal $T_{Test}$ (upper line), the block 44 sends a test signal to the sensors 41 and 42 and the result is the signal curves shifted against one another in the two multiplex phases.

The vehicle speed can be determined in a rough approximation from the wheel speed signals through the computation of the reference speed in the ABS/ABSR. The data wheel speed/vehicle speed or acceleration offer possibilities for improving crash recognition by making the trigger parameters (thresholds) variable as a function of the vehicle speed in certain ranges (greater vehicle speed=higher threshold) and/or taking into account the timing of the wheel speed signals in the triggering algorithm as a helping magnitude.

Vice versa, the acceleration signal of the vehicle can be used for calculating the gradient of the reference speed and thus it can be used for the accuracy of the reference magnitude for the calculation of slippage. The acceleration signal can also be used for engine diagnosis and for the determination of the upgrade and downgrade by comparison with the differentiated wheel speed signal. Also, erroneous wheel sensor signals (e.g., induced interference, mechanical vibration etc.) are better recognized and their effects eliminated by setting up plausibility between the timing of the wheel speeds and vehicle speed. For example, the following plausibility criteria can be applied:

$$[(V_R > S_1)(a < S_2)]t > t\ddot{u}$$

wherein:
S$_1$ is a surveillance threshold for V$_R$
S$_2$ is a surveillance threshold for a
tü is a surveillance time
The stated condition means:
If a wheel acceleration occurs for a certain time without an acceleration signal on a vehicle being measured, something is wrong.

Figure 9:
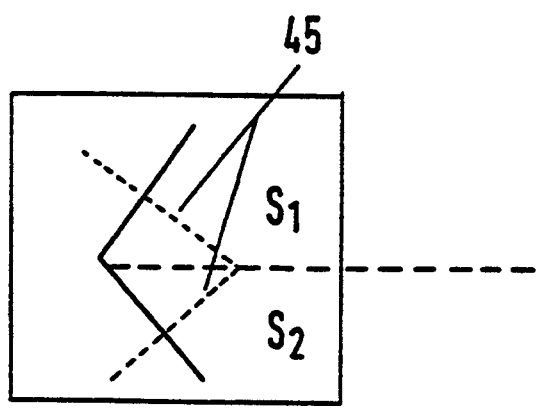
FIG. 9 is a diagram illustrating evaluation of transverse acceleration.

An evaluation of the transverse acceleration is also possible if the sensors are used accordingly (see FIG. 9). This offers the possibility of influencing a yawing moment control and adaptation of skid parameters (negotiating curves). The axes of the sensors S$_1$ and S$_2$ are here identified by 45. If desired, an additional comparison of the difference in the speed of the wheels on an axle can be included.

The sensors S$_1$ and S$_2$ are acceleration sensors which because of the directions of their axles 45 measure which lateral acceleration and which transverse acceleration is existing.

What is claimed is:

1. Safety apparatus for a vehicle, said apparatus comprising
   a wheel slippage control system comprising wheel speed sensing means which generates signals, and brake pressure control means,
   a restraint system comprising vehicle deceleration sensing means which generates signals, and occupant restraint means,
   common control apparatus having two parallel channels each of which processes signals from both said wheel speed sensing means and said vehicle deceleration sensing means, and each of which generates signals for both said brake pressure control means and said occupant restraint means, said signals processed on each channel being multiplexed so that said signals from said deceleration sensing means are processed for a first time period and said signals from said wheel speed sensing means are processed for a second time period following said first time period.

2. Safety apparatus as in claim 1 wherein each channel processes said signals from said wheel speed sensing means over a number n of said second time periods in order to generate a signal for said brake pressure control means, each channel generating a signal for said occupant restraint means after each first time period.

3. Safety apparatus as in claim 1 wherein at least one of said control signals for said brake pressure control means and said control signals for said occupant restraint means is used to control both said brake pressure control means and said occupant restraint means.

4. Safety apparatus as in claim 1 wherein said signals from said wheel speed sensing means are used in each said channel to general control signals for said occupant restraint means.

5. Safety apparatus as in claim 1, wherein said signals from said vehicle deceleration means are used in each said channel to generate control signals for said brake pressure control means.

6. Safety apparatus as in claim 1 further comprising
   surveillance means which monitors the signals generated by each channel in order to detect errors, and
   safety means responsive to detection of an error by said memory means.

7. Safety apparatus as in claim 6 wherein said safety means comprises a relay which shuts down said control apparatus when an error is detected.

8. Safety apparatus as in claim 6 wherein said safety means comprises warning lights.

9. Safety apparatus as in claim 6 further comprising an error memory which records where an error is detected, said safety means being responsive to recording of an error.

* * * * *